May 2, 1967

T. D. BISHOP 3,316,738

OLDHAM COUPLINGS

Filed July 16, 1965

3,316,738
OLDHAM COUPLINGS

Thomas Desmond Bishop, Solihull, England, assignor to The Deritend Engineering Company Limited, Birmingham, England, a British company
Filed July 16, 1965, Ser. No. 472,409
Claims priority, application Great Britain, July 29, 1964, 30,079/64
2 Claims. (Cl. 64—31)

This invention relates to "Oldham couplings" which, at least for the purposes of this specification, are defined as couplings utilising a plate having two pairs of diametral slots, for example so that each slot is 90° removed from the adjacent one, one pair of slots being connected by a pair of members to a first rotatable member and the other pair similarly to a second rotatable member; when the members (i.e., shafts) are non-axial, rotation is accompanied by reciprocation of the members in the slots.

Oldham couplings are widely used in machines for treating cardboard and the like blanks in the manufacture of cardboard boxes: such machines often have a pair of rolls which define a nip therebetween and the nip is adjustable to suit different thicknesses of material: usually the rolls are driven in absolute synchrony by a pair of meshed gears, and for obvious reasons variation in the degree of mesh with consequent blacklash is intolerable. Consequently the Oldham coupling is used to couple the one gear with the movable roll so that in nip variation the gears remain constantly and uniformly meshed.

However, there are known difficulties with these couplings because the wear rate between member and slot faces is high irrespective of the lubrication or materials employed, and after wear has taken place there is backlash in the Oldham coupling.

The object of the present invention is to provide means for adjusting Oldham couplings to compensate for wear and hence reduce or obviate backlash therein.

In accordance with the invention, an Oldham coupling has its slot faces inclined to the normal to the plate and the members engaging in the slots have complementary faces and are adjustable in a direction normal (or substantially so) to the plate.

Preferably the slot faces are V-shaped and each member comprises two co-axial frusto-conical portions located end-to-end with one reversed relative to the other. The portions may be carried on a spindle with suitable nuts and locknuts to adjust their positioning. Hence as slot face wear proceeds, the two portions are adjusted towards one another to maintain the desired fit between the member and slot or the portions may be pre-loaded to the same end.

Preferably the spindle has a shoulder at one end forming an abutment against which the portions adjust, and separate taper roll bearings are interposed between the individual portions and the spindle so that the members roll along the slots during rotation of the parts.

Figure 1:
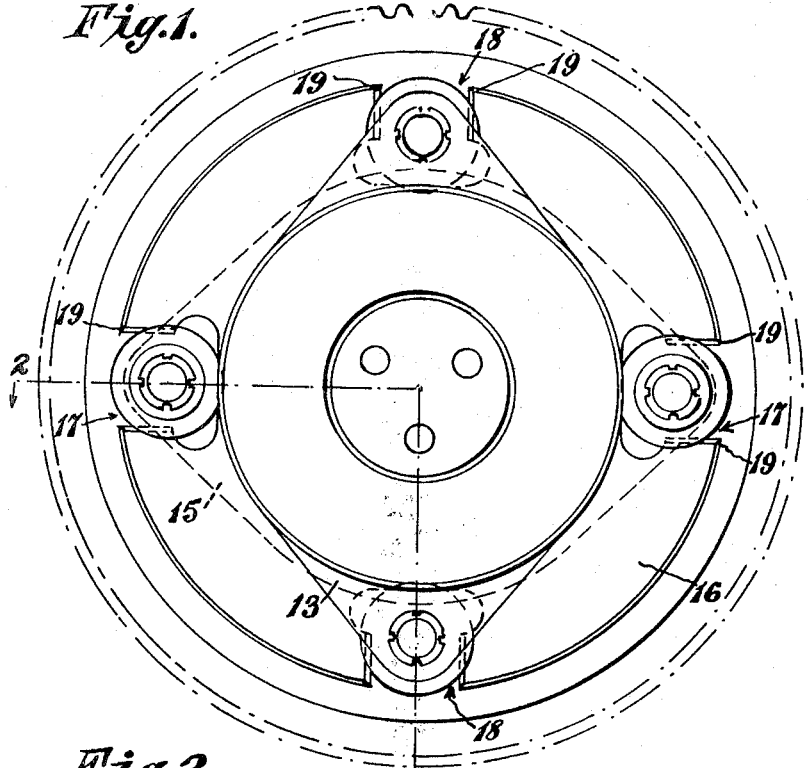
Figure 2:
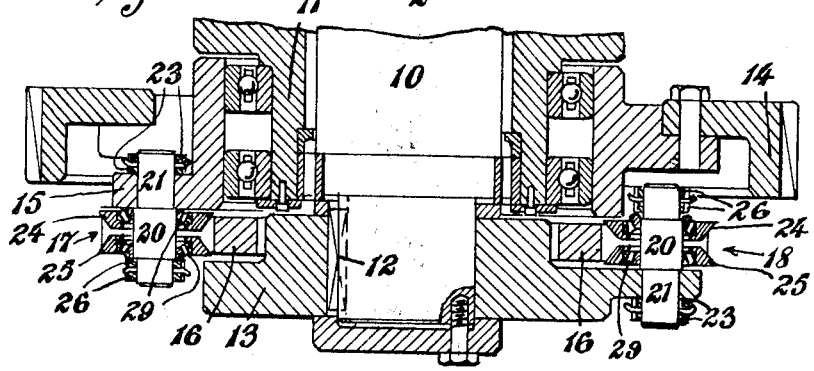

The invention is more particularly described with reference to the accompanying drawings, wherein:

FIG. 1 is an elevation of an Oldham coupling; and
FIG. 2 is a fragmentary section thereof on the line 2—2.

Referring to the drawing, a cardboard treating machine has a roll pair including a fixed and a movable roll geared together for rotation in synchronism. The movable roll has stubs 10 journalled in eccentrics 11 which are adapted for limited angular movement to vary the roll nip: one stub is keyed at 12 to a driving plate 13 which is rotated with the stub and hence about the axis of the roll and hence eccentrically (in most cases) of a mean axis. The gear 14 driving the roll and connecting it with the other roll (not shown) of the pair is journalled upon the eccentric 11 and hence upon the said mean axis and likewise has a driving flange 15 which is located close to the driving plate 13 and is fast with the gear 14.

Between the plate 13 and flange 15 is an annulus 16 or Oldham plate formed with four equi-spaced slots two of which 17, 17 are coupled to the flange 15 and two 18, 18 to the plate 13.

Each of the said slots 17, 17 and 18, 18 extends radially inwards from the periphery of plate 16, and the pairs of slots are diametrically related one with the other. Each slot has a pair of opposite side-walls each of which is of V section so that one face 19 of each side wall is obtusely related to the plate face immediately adjacent said face and the two faces of each wall are also obtusely related to one another. The apices of all the V's lie in a common plane median to the parallel faces of the plate 16.

The plate 13 and flange 15 are each coupled to the plate 16 by a pair of slidable coupling means. Each said coupling means comprises a spindle having an enlarged cylindrical centre portion 20 and threaded opposite end portions 21, 22. Each spindle is secured to the flange 15 or plate 13 as the case may be by a pair of lock nuts 23 engaged with end portion 21, and the cylindrical portions 20 extend through the Oldham plate 16 slots, one in each such slot. Journalled upon each cylindrical portion is a coupling member or spool comprising a pair of frusto-conical rollers 24, 25 located back to back, and having interposed taper roller bearings 29. The frusto-cone angles complement the V face angles of the plate 16 slots, so that the rollers 24, 25 engage said slot faces. Further lock nuts 26 locate and adjust the roller positions and clearances.

In operation the complete Oldham coupling functions in conventional manner in that plate 16 moves laterally so that the coupling members 24, 25 reciprocate in the slots. The use of non-planar complementary coupling members enables backlash to be avoided as the members 24, 25 can be adjusted or pre-loaded together so that irrespective of slot face wear the clearance may be maintained constant.

I claim:
1. An Oldham coupling comprising two rotatable members and an intermediate member for coupling the rotatable members, wherein the improvement comprises transverse slots in the intermediate member each having parallel side walls that are V-shaped in cross section, and each having therein a pair of frusto-conical rollers which fit the V-shaped side walls and which are supported by one of the rotatable members in axially adjustable relationship, the slots which contain rollers supported by one rotatable member being perpendicular to the slots which contain rollers supported by the other rotatable member.

2. An Oldham coupling according to claim 1 wherein each of the rollers is mounted on the outer race of a tapered roller bearing, the inner races of the tapered roller bearings for each pair of rollers being supported by one of the rotatable members in axially adjustable relationship.

References Cited by the Examiner
UNITED STATES PATENTS

| | | | |
|---|---|---|---|
| 1,325,680 | 12/1919 | Rayfield | 64—31 |
| 1,380,330 | 5/1921 | Ziegler | 64—31 |
| 1,648,078 | 11/1927 | Thomsen | 64—31 X |
| 2,365,128 | 12/1944 | Wahl | 64—31 X |
| 3,063,264 | 11/1962 | Forrest | 64—31 |
| 3,066,502 | 12/1962 | Forrest | 64—31 X |

FRED C. MATTERN, Jr., *Primary Examiner.*
H. C. COE, *Assistant Examiner.*